Patented Feb. 5, 1946

2,394,308

UNITED STATES PATENT OFFICE 2,394,308

PROCESS FOR MANUFACTURING ARTIFICIAL FIBER FROM PROTEIN CONTAINED IN SOYBEAN

Toshiji Kajita and Ryohei Inoue, Tokyo, Japan; vested in the Alien Property Custodian No Drawing. Original application September 8, 1937, Serial No. 162,954. Divided and this application June 7, 1939, Serial No. 277,955. In Japan May 25, 1937

2 Claims. (Cl. 18—54)

This application is a division of our application Ser. No. 162,954, filed Sept. 8, 1937.

This invention relates to a process of manufacturing artificial fibre from protein contained in soybean, and consists in extracting the protein, with dilute alkaline solution, from the residue of the soybean after the oil content has been extracted. The protein is then precipitated by adding metallic salts to said solution. The precipitate is washed with water, allowing a suitable amount of water to remain with the precipitate. Sugar is added thereto as a stabilizer and then the mixture is dissolved in alkaline solution. The resulting solution is then allowed to mature after which the solution thus obtained is spun into an acid bath which may contain suitable organic coagulating agents. The object of this invention is to produce artificial fibre of a superior quality which does not degenerate and to provide an economical and efficient process of manufacturing such fibres.

The advantages of our invention may be more fully understood from the following description.

In the present invention the protein is extracted with dilute alkaline solution from the residue of the soybean after the oil content has been extracted. The protein is then precipitated by adding metallic salts to said solution. The precipitate is washed with water, allowing a suitable amount of water to remain with the precipitate. Sugar is added and then said precipitate is dissolved in alkaline solution. Then a small amount of metallic hydrate is produced, said metallic hydrate reacts with protein in the presence of alkaline solution, consequently the hydration degree of protein is remarkably increased without changing the suitable viscosity of the spinning fluid. Said hydration degree is estimated more than 8 parts of aqueous solution against one part of soybean protein, then the stability of the spinning solution is remarkably increased. When the spinning solution, thus obtained, is spun into the coagulating bath, said spinning solution is coagulated very rapidly and the filament obtained is very fine and has much elasticity.

When the soybean protein is extracted with dilute alkaline solution from the residue of the soybean after the oil content has been extracted, the protein is then precipitated by adding acids to said solution instead of metallic salts which is used in the present invention, and then prepared spinning solution in the same process as in the present invention, the hydration degree of the protein is only less than 4 parts of aqueous solution against one part of soybean protein. When said spinning solution spun into the acid bath in which containing or not containing organic coagulating agent, the filament coagulates slowly, the resulting filament is not fine (thick) and lacks in elasticity.

Moreover in the present invention sugar is added as stabilizer to the precipitate obtained from the extraction solution above described and the mixture is then dissolved in alkaline solution, the resulting solution being allowed to mature and the solution thus obtained is spun into an acid bath which may contain suitable organic coagulating agents. By the addition of the stabilizer such as herein mentioned, the oxidation or decomposition of protein can be prevented during the process, especially during the step of maturing. Moreover while the spinning solution is maturing, a homogeneous solution is obtained and the spinning can be easily carried on. The resulting fibre does not degenerate and a very pliant touch as well as an excellent dyeing ability is obtained. In manufacturing a fiber from a spinning solution prepared by dissolving the protein of the soybean in alkaline solution to which sugar has not been added and which is not submitted to maturing, the protein is oxidized and decomposed during the process and consequently the filament is broken during the spinning step and continuous spinning cannot therefore be carried on. Moreover, the fiber thus obtained is very hard and brittle and consequently of no practical use.

One example of carrying out the invention into practice is as follows:

The residue of soybean from which the oil content has been extracted and containing 40 to 47% of protein is subjected to extraction with an alkaline solution diluted 5 to 10 times by weight, for example, 0.2 to 2% of ammonia solution or caustic alkaline solution at the temperature of 20° to 30° C., for about 2 to 5 hours, whereby the protein amounting to 10 to 20% of the total amount of the raw material may be extracted. The protein thus obtained is purified by adding a dilute solution of hydrogen peroxide or sodium peroxide and bone charcoal or china clay and then filtered. To the transparent solution thus obtained a 30 to 40% aqueous solution of metallic salts of acids, for example, copper sulphate, zinc sulphate, zinc acetate, copper acetate is added and until the solution becomes weakly acidic, whereby the protein or proteic salt is precipitated. The precipitate thus obtained is thoroughly washed with water to remove adhering salts and acids and separated by filtering.

Then sugar is added as a stabilizer at the rate of 0.2 to 0.5% to said precipitate which contains 75 to 85% of water and subsequently said mixture is well mixed and kneaded in an alkaline solution of 25 to 40% concentration which corresponds to 3 to 7% of the protein content whereby a colloidal solution is produced. Then by filtering and removing bubbles, and maturing the said solution at the temperature of 10° to 20° C. for 2 to 3 days, a spinning solution is obtained. This spinning solution is then spun in the usual manner or allowed to fall into an acid bath of 10 to 50% concentration or an acid bath containing in addition 10 to 20% of an organic coagulating agent such as alcohol, formaldehyde, acetone, etc., and then submitted to the finishing procedure.

According to the present invention, a proteic artificial fibre of superior quality resembling wool or natural silk which does not degenerate can be obtained.

What we claim is:

1. The process of manufacturing artificial fiber from protein contained in the soybean, consisting in extracting the protein with dilute alkaline solution from the residue of the soybean from which the oil content has been extracted, precipitating the protein by adding metallic salt to said solution, washing said precipitate with water, adding sugar while the precipitate is wet, dissolving the said mixture in an alkaline solution permitting the resulting solution to mature, spinning the solution thus obtained into an acid bath containing organic coagulating agents.

2. The process of manufacturing artificial fiber from protein contained in the soybean, consisting in extracting the protein with dilute alkaline solution from the residue of the soybean from which the oil content has been extracted, precipitating the protein by adding metallic salt to said solution, washing said precipitate with water, adding sugar while the precipitate is wet, dissolving the said mixture in an alkaline solution permitting the resulting solution to mature, spinning the solution thus obtained into an acid bath.

TOSHIJI KAJITA.
RYOHEI INOUE.